United States Patent
Dotzler

(10) Patent No.: US 10,043,386 B2
(45) Date of Patent: Aug. 7, 2018

(54) VEHICLE COMMUNICATION SYSTEM

(71) Applicant: DENSO International America, Inc., Southfield, MI (US)

(72) Inventor: Kevin Dotzler, Poway, CA (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/213,945

(22) Filed: Jul. 19, 2016

(65) Prior Publication Data

US 2018/0025637 A1  Jan. 25, 2018

(51) Int. Cl.
*G08G 1/0967* (2006.01)
*B60C 9/00* (2006.01)
*G08G 1/16* (2006.01)
*G08G 1/0965* (2006.01)

(52) U.S. Cl.
CPC ......... *G08G 1/096775* (2013.01); *B60C 9/00* (2013.01); *G08G 1/0965* (2013.01); *G08G 1/162* (2013.01); *B60T 2201/022* (2013.01)

(58) Field of Classification Search
CPC .................. G08G 1/0965; G08G 1/162; B60T 2201/022; B60T 2201/08; B60T 2201/081; B60T 2210/34; G01S 13/931; B60W 30/18154
See application file for complete search history.

(56) References Cited

U.S. PATENT DOCUMENTS

| 5,754,099 A * | 5/1998 | Nishimura ................ B60T 7/22 340/435 |
| 5,838,238 A | 11/1998 | Abita et al. |
| 6,067,031 A * | 5/2000 | Janky ..................... G08G 1/166 180/169 |
| 6,275,773 B1 * | 8/2001 | Lemelson ............... G01S 19/11 340/436 |
| 6,798,354 B2 | 9/2004 | Schuessler |
| 2003/0090392 A1 * | 5/2003 | Schuessler ........... G08G 1/0965 340/988 |
| 2004/0193347 A1 * | 9/2004 | Harumoto ........... B60R 21/0132 701/45 |
| 2014/0180568 A1 * | 6/2014 | Nagata ..................... B60T 7/22 701/301 |

* cited by examiner

*Primary Examiner* — Mirza Alam
(74) *Attorney, Agent, or Firm* — Harness, Dickey & Pierce, P.L.C.

(57) ABSTRACT

A vehicle communication system including a danger zone controller configured to set parameters of a danger zone, the parameters including location and size of the danger zone. A transmitter is configured to transmit the parameters of the danger zone to vehicles. A vehicle receiver of a vehicle is configured to receive the parameters of the danger zone in order to notify a driver of the vehicle of the danger zone.

15 Claims, 4 Drawing Sheets

VEHICLE COMMUNICATION SYSTEM

FIELD

The present disclosure relates to a vehicle communication system, such as a system configured to establish a danger zone and notify vehicles of the danger zone.

BACKGROUND

This section provides background information related to the present disclosure, which is not necessarily prior art.

Various systems exist to warn drivers of obstacles and hazards. While current systems are suitable for their intended use, they are subject to improvement. The present teachings provide improved driver warning systems that advantageously establish a danger zone and notify drivers of the danger zone.

SUMMARY

This section provides a general summary of the disclosure, and is not a comprehensive disclosure of its full scope or all of its features.

The present teachings are directed to a vehicle communication system configured to establish a danger zone, and notify vehicles of the danger zone.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
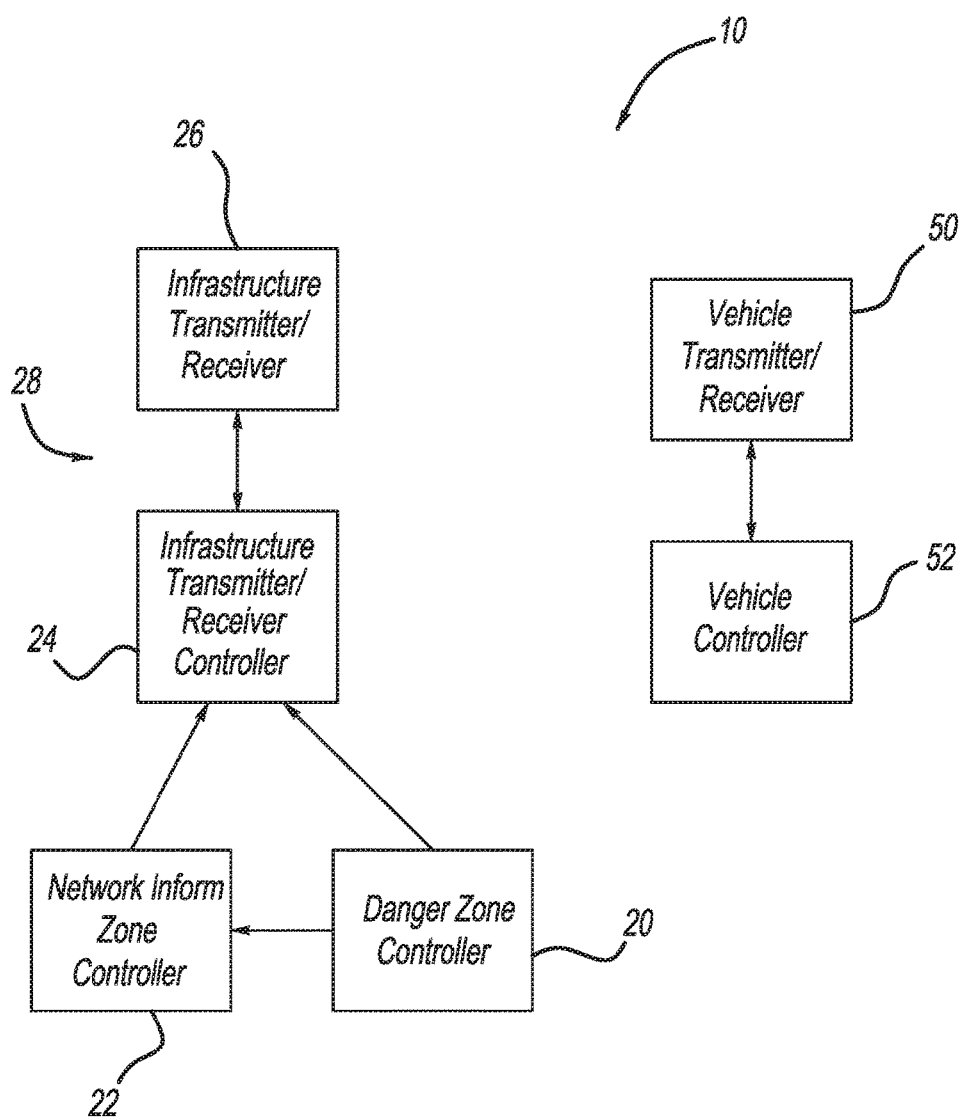
FIG. 1 illustrates a communication system according to the present teachings.
Figure 2:
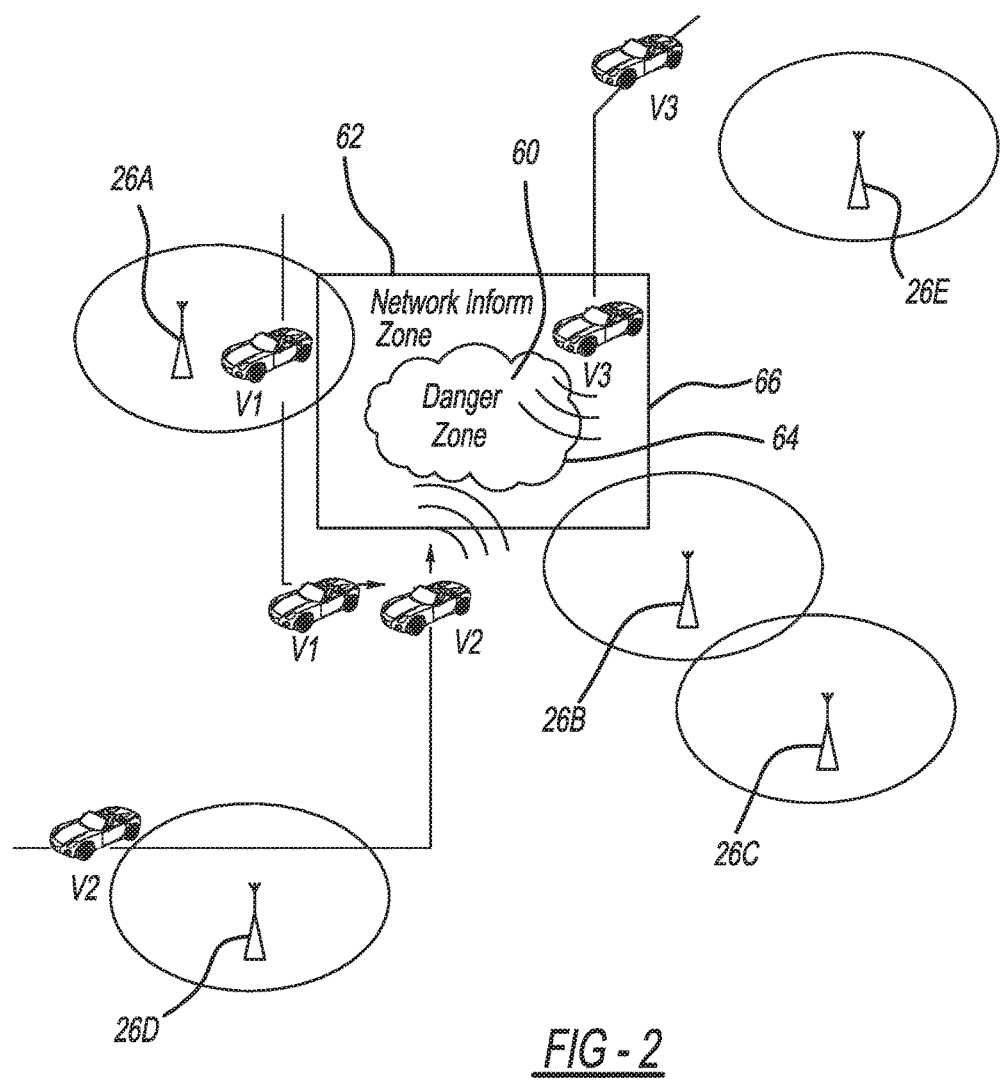
FIG. 2 illustrates the communication system according to the present teachings, as well as a danger zone and network inform zone established thereby.

With initial reference to FIG. 1, a vehicle communication system according to the present teachings is generally illustrated at reference numeral 10. The communication system 10 is generally configured to establish a danger zone (an exemplary danger zone is illustrated in FIG. 2 at 60) and notify vehicles of the danger zone, as explained in detail herein. The danger zone can be any area, object, condition, etc. that may pose a danger to a vehicle and/or occupants thereof. For example, the danger zone may be or include any one or more of the following: a construction zone, dangerous road condition, railway, one-way road, police situation area, fire situation area, and malfunctioning traffic signal. Although the communication system 10 is described herein as being used with an automobile, the communication system 10 can be configured for use with any suitable vehicle, such as any suitable passenger vehicle, mass transit vehicle, train, military vehicle, watercraft, aircraft, construction vehicle, etc.

The communication system 10 generally includes a danger zone controller 20 and a network inform zone controller 22, each of which is individually in communication with an infrastructure transmitter/receiver controller 24. The controller 24 is in communication with, and is configured to control, infrastructure transmitter/receiver 26. In this application, the term "controller" may be replaced with the term "circuit." The term "controller" may refer to, be part of, or include processor hardware (shared, dedicated, or group) that executes code and memory hardware (shared, dedicated, or group) that stores code executed by the processor hardware. The code is configured to provide the features of the controllers and systems described herein.

Figure 3:
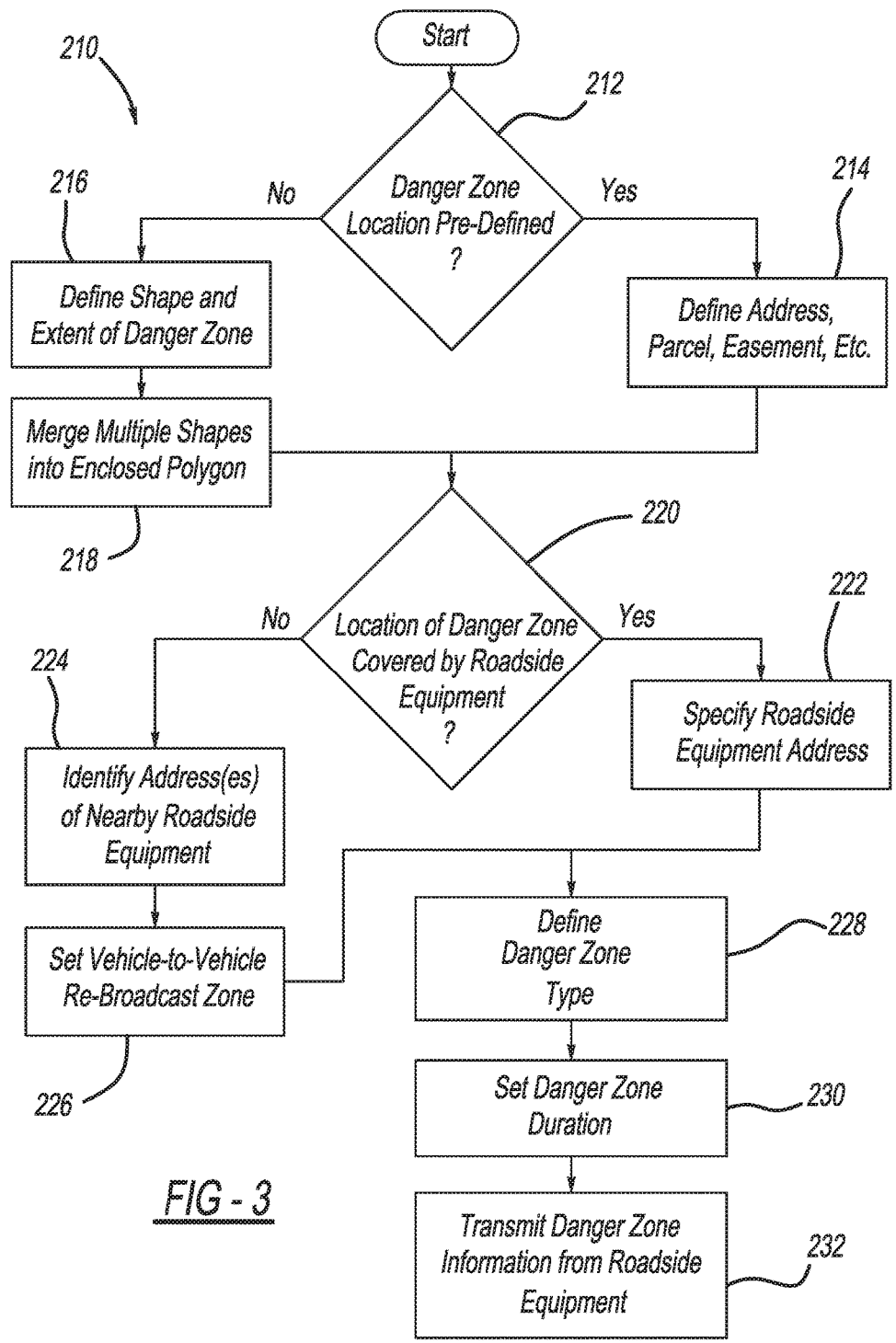
FIG. 3 illustrates a method for establishing a danger zone according to the present teachings.

The danger zone controller 20 is configured to accept inputs from any suitable source, such as police, fire department personnel, authorized road construction personnel, traffic control authorities, government agencies, any suitable automated source, etc. The inputs can be any suitable inputs including parameters of the danger zone, such as danger zone 60 illustrated in FIG. 2. For example, inputs to the danger zone controller 20 may include location of the danger zone, such as GPS coordinates of an outer boundary 64 thereof, duration of the condition giving rise to the danger zone, the type of danger zone, etc. If the danger zone 60 is a construction zone, for example, inputs to the danger zone controller 20 may include the outer boundaries of the construction zone and the duration of the construction project. FIG. 3 illustrates an exemplary method 210 for establishing a danger zone, and will be described herein.

The network inform zone controller 22 is configured to receive inputs from the same source(s) listed above with respect to the danger zone controller 20, as well as inputs from the danger zone controller 20 itself. The network inform zone controller 22 is configured to receive parameters of a network inform zone (NIZ) surrounding the danger zone. For example and with respect to FIG. 2, network inform zone 62 has an outer boundary 66 that surrounds the outer boundary 64 of the danger zone 60. The network inform zone 62 thus provides a warning zone or "buffer" about the danger zone 60. The system 10 is configured to provide drivers with the parameters of the danger zone 60 before vehicles enter the network inform zone 62, or just after. The parameters of the network inform zone 62 include, but are not limited to, location of the network inform zone 62 relative to the danger zone 60, which may include distance between the outer boundary 64 of the danger zone 60 and the outer boundary 66 of the network inform zone 62, as well as any other relevant information regarding the size, location, and duration of the network inform zone 62. The network inform zones, such as NIZ 62, can be preconfigured to contain various danger zones, such as danger zone 60, or simply areas of coverage.

The danger zone controller 20 and the network inform zone controller 22 can thus be, for example, computer terminals of relevant personnel configured to accept, as inputs, parameters of the danger zone 60 and the network inform zone 62. The danger zone and network inform zone controllers 20 and 22 can be at any suitable location accessible to those with authority to set parameters of the danger and network inform zones 60 and 62. The controllers 20 and 22 can also be accessible through a remote or portable device, such as a smartphone of authorized personnel. Further, the controllers 20 and 22 may be included with a smartphone of an authorized person.

The danger zone and network inform zone controllers 20 and 22 are in communication with the infrastructure transmitter/receiver controller 24 in any suitable manner, such as through a wireless or hardwire connection. The infrastructure transmitter/receiver controller 24 is configured to control the transmitter/receiver 26 to transmit parameters of the danger zone 60 received from the danger zone controller 20, and transmit parameters of the network inform zone 62 received from the network inform zone controller 22. The infrastructure transmitter/receiver controller 24 is further configured to process signals received by the transmitter/receiver 26, such as signals including requests for the parameters of the danger zone 60 and/or the network inform zone 62. The infrastructure transmitter/receiver controller 24 can be at any suitable location, such as at a site of the infrastructure transmitter/receiver 26, or located remotely thereto. The infrastructure transmitter/receiver controller 24 is in communication with the transmitter/receiver 26 in any suitable manner, such as through any suitable wired or wireless connection. The transmitter/receiver 26 can be any suitable transmitter/receiver configured to transmit and receive information, such as by way of radiofrequency signals.

The infrastructure transmitter/receiver 26 can be located at any suitable location, such as along a roadside. For example, the transmitter/receiver 26 can be a stationary roadside transmitter/receiver mounted to an antenna tower. The infrastructure transmitter/receiver controller 24 and the infrastructure transmitter/receiver 26 can thus be configured as roadside equipment 28 of the system 10. FIG. 2 illustrates a plurality of infrastructure transmitters/receivers 26 mounted to antenna towers at reference numerals 26A, 26B, 26C, 26D, and 26E.

The system 10 further includes a vehicle transmitter/receiver 50, which can be any suitable transmitter/receiver configured to communicate with the infrastructure transmitter/receiver 26, such as by radiofrequency communication. The vehicle transmitter/receiver 50 can be mounted to any suitable vehicle. For example and with reference to FIG. 2, each one of the vehicles V1, V2, and V3 include their own vehicle transmitter/receiver 50. Each one of the vehicle transmitter/receivers 50 is in communication with a vehicle controller 52 onboard the vehicles V1, V2, and V3. Each one of the vehicles V1, V2, and V3 includes its own vehicle controller 52. Each one of the vehicle controllers 52 is in communication with the vehicle transmitter/receiver 50 onboard the same vehicle in any suitable manner, such as with any suitable wired or wireless connection.

Each one of the vehicle controllers 52 is configured to receive and process parameters of the danger zone 60 and the network inform zone 62 received by the vehicle transmitter/receiver 50 from the infrastructure transmitter/receiver 26, or from other vehicles as described herein. The vehicle controller 52 is configured to inform a driver and occupants of the vehicles V1, V2, and V3 of the parameters of the danger zone 60 and network inform zone 62 in any suitable manner, such as by way of onboard vehicle equipment including, but not limited to, a vehicle display screen and/or an audible alert system.

With continued reference to FIGS. 1 and 2, and additional reference to FIG. 3, an exemplary method 210 for establishing the danger zone 60 will now be described. The method 210 is generally performed by the danger zone controller 20 in response to inputs thereto by authorized personnel. With reference to block 212, the danger zone controller 20 is configured to determine whether the location of the danger zone 60 has been previously defined. If the danger zone location has been predefined, the method 210 proceeds to block 214, where the specific address of the predefined danger zone location is retrieved, such as from any suitable storage memory accessible by the danger zone controller 20.

If at block 212 the danger zone controller 20 determines that the location of the danger zone 60 was not predefined, the method 210 proceeds to block 216. At block 216, the danger zone controller 20 is configured to receive parameters of the danger zone 60, such as inputs defining the shape and extent of the danger zone 60 from any suitable authorized personnel. For example, if the danger zone 60 is a police situation zone or an accident site, at block 216 the danger zone controller 20 is configured to receive coordinates defining the shape and extent of the danger zone 60. At block 218, any irregular shapes that result from defining the shape and extent of the danger zone 60 in block 216 can be merged into an enclosed polygon at block 218.

From blocks 214 and 218, the method 210 proceeds to block 220. At block 220, the danger zone controller 20 determines whether the location of the danger zone 60, or at least the network inform zone 62 associated therewith, is covered by roadside equipment 28. More specifically, at block 220 the controller 20 determines whether the danger zone 60, or at least the network inform zone 62, is within the communication range of the infrastructure transmitter/receiver 26. For example and with reference to FIG. 2, at block 220 the controller 20 determines whether any one or more of the transmitters/receivers 26A-26E have a communication range that includes the danger zone 60, or at least the network inform zone 62. In the example of FIG. 2, the network inform zone 62 of the danger zone 60 is within the communication range of the transmitter/receiver 26A and the transmitter/receiver 26B.

If at block 220 the controller 20 determines that the danger zone 60 or the network inform zone 62 is within the communication range of one or more transmitter/receiver 26, the method 210 proceeds to block 222. At block 222, the danger zone controller 20, in cooperation with the infrastructure transmitter/receiver controller 24, identifies the network address of each transmitter/receiver 26 having a communication range that includes the danger zone 60, or at least the network inform zone 62.

If at block 220 the controller 20 determines that there is no transmitter/receiver 26 with a communication range that includes the danger zone 60 or the network inform zone 62, at block 224 the controller 20 in cooperation with the infrastructure transmitter/receiver controller 24 identifies the network addresses of the transmitter/receivers 26 that are closest to the danger zone 60. At block 226, the vehicle-to-vehicle rebroadcast zone is set by any one or more of the controllers 20, 22, 24, so as to limit the rebroadcast of parameters of the danger zone 60 by a vehicle in receipt of such parameters. For example, and with reference to FIG. 2, vehicle V1 is in receipt of parameters regarding the zones 60 and/or 62 from the transmitter/receiver 26A. In contrast, the vehicle V2 has no such information because the only transmitter/receiver 26 that the vehicle V2 has been within the communication range of is the transmitter/receiver 26D, which in the example of FIG. 2 is not configured to transmit parameters of either the network inform zone 62 or the danger zone 60. The vehicle controller 52 of the vehicle V1 is configured to transmit the parameters of the zones 60 and/or 62 from the vehicle transmitter/receiver 50 of the vehicle V1 for receipt by the vehicle V2. Thus the vehicle V2 benefits from the rebroadcast of the parameters of the zones 60 and/or 62. The vehicle V2 can then rebroadcast the parameters of the zones 60 and/or 62 to any other vehicle, such as vehicle V3. At block 226, the extent to which the vehicles rebroadcast parameters of the zones 60 and/or 62 is set. For example, a distance from the zones 60 and/or 62 can be set whereby when the vehicles are beyond the set distance the parameters will not be rebroadcast.

From blocks 222 and 226, the method 210 proceeds to block 228. At block 228, the danger zone controller 20 accepts and stores inputs from authorized personnel that define the type of the danger zone 60. For example, the danger zone 60 can be defined as any one or more of a construction zone, dangerous road condition, railway, one-way road, police situation area, fire situation area, and malfunctioning traffic signal. At block 230, the danger zone controller 20 sets the duration of the danger zone 60 in accordance with inputs from authorized personnel. For example, if the danger zone 60 is a construction zone, the input at block 230 can be the expected duration of the construction project.

At block 232, the method 210 transmits information regarding the danger zone 60 using the roadside equipment 28. Specifically, the danger zone controller 20 transmits parameters of the danger zone 60, such as the location, type, and duration thereof, to the infrastructure transmitter/receiver controller 24. The infrastructure transmitter/receiver controller 24 then operates one or more infrastructure transmitter/receivers 26, such as the transmitter/receivers 26A and 26B closest to the danger zone 60, so as to transmit the parameters to vehicles within their communication range. With the parameters of the danger zone 60 set, the network inform zone controller 22 sets the location and duration of the network inform zone 62 in response to inputs from authorized personnel. These parameters of the network inform zone 62, as well as any other parameters thereof, can be transmitted in any suitable manner along with, prior to, or after the parameters of the danger zone 60 are transmitted.

Figure 4:
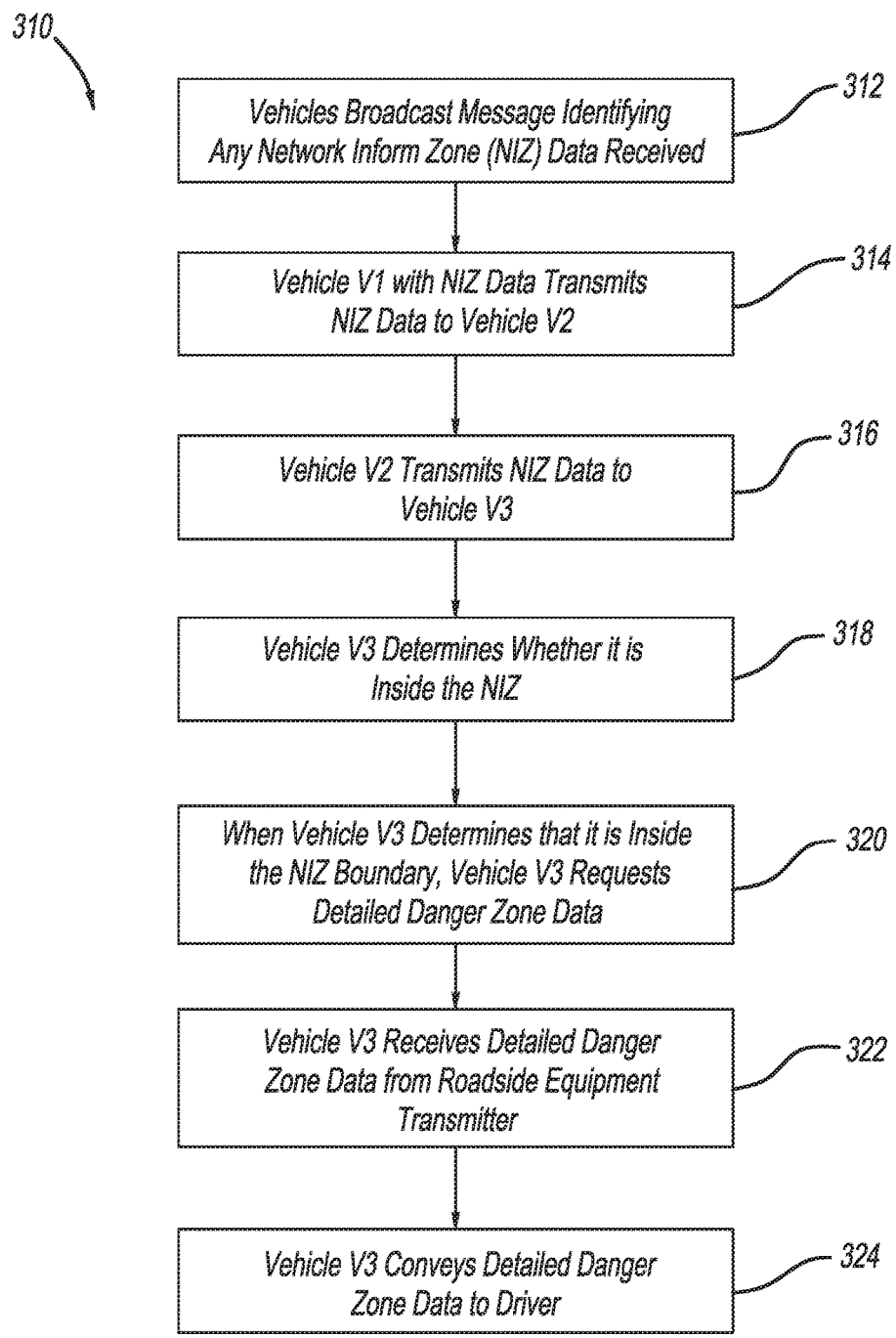
FIG. 4 illustrates a method according to the present teachings for transmitting information regarding a danger zone and network inform zone to a vehicle.

With continued reference to FIGS. 1-3, and additional reference to FIG. 4, a method 310 for transmitting detailed information regarding the danger zone 60 to vehicles, such as vehicles V1, V2, and V3 of FIG. 2, will now be described. With initial reference to block 312, the vehicles V1, V2, and V3 each broadcast a message identifying any network inform zone (NIZ) data received regarding the NIZ 62, or any other NIZ. Thus in the example of FIG. 2, vehicles V2 and V3 do not pass within the communication range of any of the transmitters/receivers 26A and 26B broadcasting NIZ data regarding the network inform zone 62, and thus the vehicles V2 and V3 broadcast a message indicating that they are without NIZ data for the NIZ 62.

At block 314, vehicle V1 recognizes that vehicle V2 is without NIZ data for NIZ 62, and thus vehicle V1 transmits the NIZ data that it received from the transmitter/receiver 26A to the vehicle V2 when the vehicles V1 and V2 are within the communication range of each other's vehicle transmitter/receiver 50. At block 316, the vehicle V2 transmits the NIZ data received from vehicle V1 to vehicle V3. At block 318, vehicle V3 determines whether it is inside the NIZ 62 based on the NIZ data received from vehicle V2. When the vehicle V3 determines that it is inside the NIZ outer boundary 66 (block 320), vehicle V3 transmits a signal from its transmitter/receiver 50 requesting detailed parameters of the danger zone 60, such as the specific dimensions, location, type, duration, etc. of the danger zone 60. This request can be transmitted to the transmitter/receivers 26A or 26B directly or indirectly by way of vehicle-to-vehicle communication.

At block 322, vehicle V3 receives the detailed data regarding the danger zone 60 directly from the transmitter/receiver 26A if the vehicle V3 is within communication range, or from vehicle V2 by way of vehicle-to-vehicle communication (vehicle V2 receives the detailed data regarding the danger zone 60 from the transmitter/receiver 26A directly, or by way of the vehicle V1). Vehicles V2 and V1 can also request detailed danger zone data regarding the danger zone 60 when they enter the network inform zone 62. At block 324, the vehicle controller 52 conveys the detailed danger zone data to the driver in any suitable manner, such as by way of any suitable vehicle information system, which may include a vehicle display screen, a heads up display, haptic feedback, and/or any suitable audio notification.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A vehicle communication system comprising:
a network inform zone controller configured to set parameters of a network inform zone encompassing a danger zone established by authorized personnel, the parameters including location and size of the network inform zone;
a danger zone controller configured to set parameters of the danger zone including location and size of the danger zone;
a stationary, ground-based transmitter configured to transmit the parameters of the network inform zone to vehicles;
a stationary, ground-based receiver;
a vehicle receiver of a vehicle configured to receive the parameters of the network inform zone in order to notify a driver of the vehicle of the network inform zone, the parameters of the network inform zone include distance between an outer boundary of the danger zone and an outer boundary of the network inform zone;
a vehicle controller of the vehicle configured to, upon determining that the vehicle has entered the network inform zone based on the parameters of the network inform zone, control a vehicle transmitter of the vehicle to request the parameters of the danger zone from the danger zone controller by way of the stationary, ground-based receiver, the parameters of the danger zone including at least one of dimensions, location, type, and duration; and
a transmitter controller configured to receive inputs from the network inform zone controller and the danger zone controller, and control the stationary, ground-based transmitter to selectively transmit parameters of the network inform zone or parameters of the danger zone;
wherein the vehicle controller is configured to control the vehicle transmitter to transmit the parameters of the vehicle inform zone to other vehicles.

2. The vehicle communication system of claim 1, further comprising:
wherein:
the transmitter is configured to transmit the parameters of the danger zone; and
the vehicle receiver is configured to receive the parameters of the danger zone in order to notify the driver of the vehicle of the danger zone.

3. The vehicle communication system of claim 1, wherein the transmitter is an infrastructure transmitter.

4. The vehicle communication system of claim 1, wherein the transmitter is a stationary roadside transmitter.

5. The vehicle communication system of claim 1, wherein the vehicle controller is configured to control the vehicle transmitter to transmit the parameters of the vehicle danger zone to other vehicles.

6. The vehicle communication system of claim 1, wherein the danger zone is at least one of a construction zone, dangerous road condition, railway, one-way road, police situation area, fire situation area, and a malfunctioning traffic signal; and
wherein the authorized personnel include at least one of police, fire department, and road construction personnel.

7. A method of alerting a driver of a vehicle of a danger zone, the method comprising:
setting parameters of the danger zone with a danger zone controller, the parameters including location and size of the danger zone, the danger zone established by authorized personnel;
setting parameters of a network inform zone surrounding the danger zone within a network inform zone controller, the parameters of the network inform zone include distance between an outer boundary of the danger zone and an outer boundary of the network inform zone;
transmitting the parameters of the danger zone from a stationary, ground-based transmitter;
receiving the parameters of the danger zone at a vehicle receiver of the vehicle;
upon determining that the vehicle has entered the network inform zone based on the parameters of the network inform zone, a vehicle controller controls a vehicle transmitter of the vehicle to request the parameters of the danger zone from the danger zone controller by way of the stationary, ground-based receiver, the parameters of the danger zone including at least one of dimensions, location, type, and duration; and
notifying the driver of the vehicle of the danger zone only when the driver is within the network inform zone;
wherein a transmitter controller is configured to receive inputs from the network inform zone controller and the danger zone controller, and control the stationary, ground-based transmitter to selectively transmit parameters of the network inform zone or parameters of the danger zone; and
wherein the vehicle controller is configured to control the vehicle transmitter to transmit the parameters of the vehicle inform zone to other vehicles.

8. The method of claim 7, wherein the transmitter is an infrastructure transmitter.

9. The method of claim 7, further comprising transmitting the parameters of the danger zone between two vehicles.

10. The method of claim 7, further comprising:
transmitting the parameters of the network inform zone from the transmitter;
receiving the parameters of the network inform zone at the vehicle receiver of the vehicle; and
notifying the driver of the network inform zone.

11. The method of claim 7, wherein the parameters of the danger zone are set by a danger zone controller that is included with infrastructure.

12. The method of claim 7, wherein the danger zone is at least one of a construction zone, railway, one-way road, police situation area, fire situation area, and a malfunctioning traffic signal.

13. A vehicle communication system comprising:
a danger zone controller configured to set parameters of a danger zone established by authorized personnel, the parameters including location and size of the danger zone;
a network inform zone controller configured to set parameters of a network inform zone encompassing the danger zone, the parameters of the network inform zone including: location and size of the network inform zone; and distance between an outer boundary of the danger zone and an outer boundary of the network inform zone;
a stationary, ground-based transmitter configured to transmit the parameters of the danger zone to vehicles;
a stationary, ground-based receiver;
a vehicle receiver of a vehicle configured to receive the parameters of the danger zone in order to notify a driver of the vehicle of the danger zone;
a vehicle controller of the vehicle configured to, upon determining that the vehicle has entered the network inform zone based on the parameters of the network inform zone, control a vehicle transmitter of the vehicle to request the parameters of the danger zone from the danger zone controller by way of the stationary, ground-based receiver, the parameters of the danger zone including at least one of dimensions, location, type, and duration;
wherein a transmitter controller is configured to receive inputs from the network inform zone controller and the danger zone controller, and control the stationary, ground-based transmitter to selectively transmit parameters of the network inform zone or parameters of the danger zone; and
wherein the vehicle controller is configured to control the vehicle transmitter to transmit the parameters of the vehicle inform zone to other vehicles.

14. The vehicle communication system of claim 13, wherein the vehicle receiver is configured to receive the parameters of the network inform zone transmitted by the transmitter in order to notify a driver of the vehicle of the network inform zone;
wherein the danger zone includes at least one of a construction zone, dangerous road condition, railway, one-way road, police situation area, fire situation area, and a malfunctioning traffic signal; and
wherein the authorized personnel include at least one of police, fire fighters, and road construction personnel.

15. The vehicle communication system of claim 13, wherein the transmitter is a stationary, infrastructure transmitter.

* * * * *

UNITED STATES PATENT AND TRADEMARK OFFICE
CERTIFICATE OF CORRECTION

PATENT NO. : 10,043,386 B2
APPLICATION NO. : 15/213945
DATED : August 7, 2018
INVENTOR(S) : Kevin Dotzler Page 1 of 1

It is certified that error appears in the above-identified patent and that said Letters Patent is hereby corrected as shown below:

In the Claims

Column 9, Line 22, In Claim 13, after "including:", insert --¶--

Column 9, Line 23, In Claim 13, after "and", insert --¶--

Signed and Sealed this
Eighteenth Day of June, 2019

Andrei Iancu
*Director of the United States Patent and Trademark Office*